J. J. CRAWFORD.
Joint for Hydraulic-Nozzle.

No. 167,505. Patented Sept. 7, 1875.

Witnesses
Geo. H. Strong.
Jno. L. Boone.

Inventor
John J. Crawford
by Dewey & Co
Attys

UNITED STATES PATENT OFFICE.

JOHN J. CRAWFORD, OF SAN FRANCISCO, CALIFORNIA.

IMPROVEMENT IN JOINTS FOR HYDRAULIC NOZZLES.

Specification forming part of Letters Patent No. 167,505, dated September 7, 1875; application filed August 19, 1875.

*To all whom it may concern:*

Be it known that I, JOHN J. CRAWFORD, of San Francisco city and county, State of California, have invented an Improved Joint for Hydraulic Nozzles; and I do hereby declare the following description and accompanying drawings are sufficient to enable any person skilled in the art or science to which it most nearly appertains to make and use my said invention or improvement without further invention or experiment.

My invention relates to an improved joint for connecting nozzles to hydraulic pipes such as are used in hydraulic mining.

The object of my improvement is to so construct and combine a ball-and-socket joint with the water-pipe and nozzle that it will move easily under pressure, be free from leakage, and present no obstruction to the passing stream, especially when the nozzle is deflected. It also embraces an improved balancing device for sustaining the nozzle at whatever elevation it may be directed.

In order to properly describe my invention, reference is had to the accompanying drawing forming a part of this specification, in which—

Figure 1:
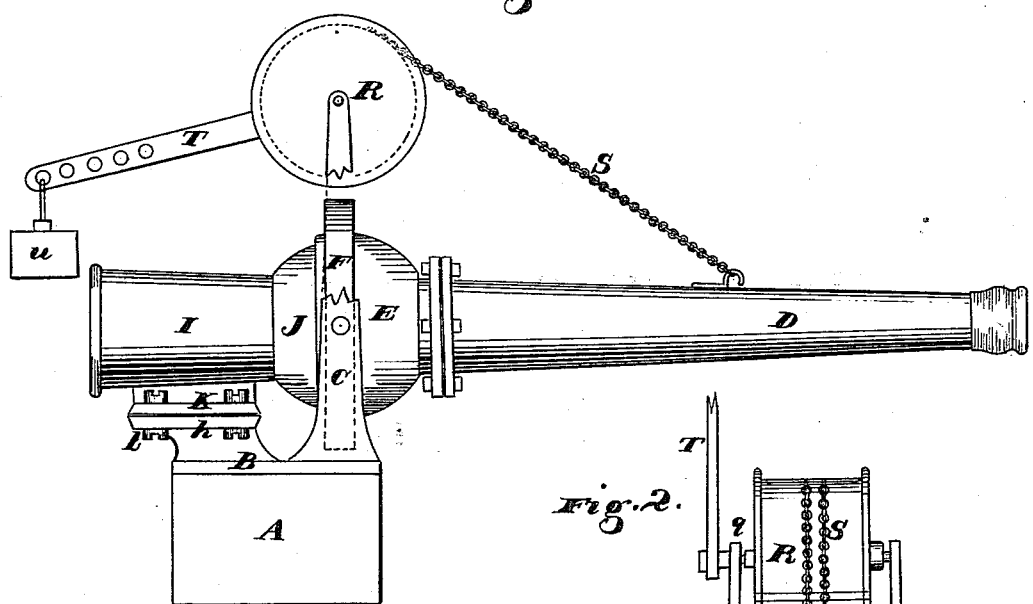
Figure 2:
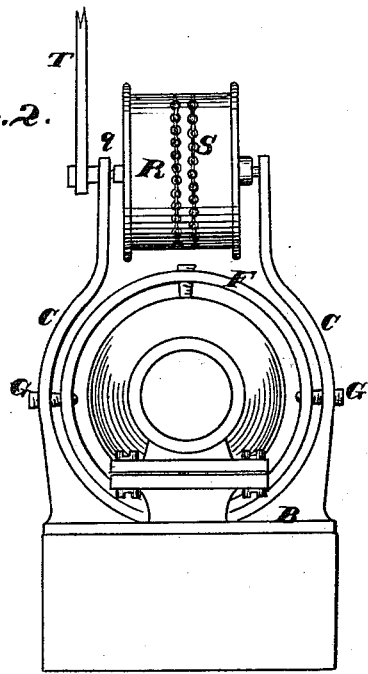
Figure 3:
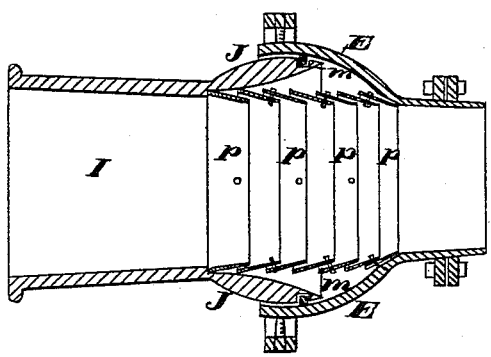

Figure 1 is a side elevation of my invention. Fig. 2 is a rear-end elevation. Fig. 3 is a longitudinal section.

Let A represent the block or piece of timber upon which the joint is supported or rests. Upon this block I secure a casting, B, which has two standards, C C, extending upward to the desired height, one from each side of the casting B. D is the nozzle, the rear end of which can either be formed into a socket, E, or the socket may be made independently and attached to it. Between the two upright standards C C I mount a ring, F, by means of pivots or journals $g\ g$, which bear in the standards upon opposite sides of the ring, so that the ring can turn freely about a horizontal axis. Inside of this ring I place the socket E, and secure it to the ring by pivots or journals above and below, so that it will turn freely about a vertical axis inside of the ring. The socket and ring will thus form a universal joint or gimbal, which will permit the nozzle to be turned in any direction inside of a semicircle. Upon the casting B in rear of the standards C C, and directly in line with the nozzle, is a ledge, $h$, and upon this ledge I secure a short section of straight pipe, I, the forward end of which is formed into a globular or spherical ball or head, J. The pipe I is provided with a foot or bed plate, K, and this is secured upon the ledge $h$ by means of bolts $l$, which pass through slots in the bed-plate and holes in the ledge. By loosening the bolts $l$ the ball or globular head J can be adjusted to or from the socket E, as desired. In a grooved seat around the outside of the globular or spherical head or ball J I place a metal expansion or packing ring, $m$. When the ball is firmly compressed inside of the socket this ring will fit against the inner face of the socket and make a tight joint. The screws or bolt $l$ can then be securely fastened, so as to retain the ball in its proper relation to the socket. This metallic packing or expansion ring may be seated on the internal face or surface of the socket E, so as to press firmly against the external or spherical portion of the head J, and it may be faced or covered with leather or other flexible material. A leather packing can also be applied around the inner edge of the ball, so as to be forced against the inside face of the socket by the internal pressure of the water, thus making a completely water-tight joint.

The gimbal suspension of the nozzle and socket will permit them to be shifted about to any desired angle inside of a semicircle without altering the relation of the ball and socket, and at the same time preserving their water-tight connection. It will thus be seen that I provide a joint which is held together and made water-tight solely by external means, thus avoiding the usual obstructions to the passage of the stream, which are produced when the joint is held together by bolts or other internal devices.

In this machine the stream comes into the pipe I and nozzle D in a straight line, thereby preserving the full force of the stream, while in other hydraulic machines it is impaired by the tortuous course it must take, making two or more bends, under the most favorable conditions. In this machine, no difference at what angle the nozzle is deflected, the stream makes but one bend. Owing to the conformation of the ball and socket to adapt them to this purpose, an enlargement or trumpet-shaped chamber is formed inside of the joint or ball, so that when the nozzle is at its greatest deflection there will be no part of the ball protruding into the socket or nozzle to cut off or contract the stream, but will permit a free and natural passage for the same.

In order to avoid the forming of dead-water, (which occurs in this class of joints as applied to ordinary hydraulic machines,) I construct a circular diaphragm, which is composed of metallic or other leaves $p\ p$. These circular leaves overlap each other so as to form a flexible connecting or articulating pipe, which extends directly between the pipe I and rear end of the nozzle, so that the area of the water-passage will be uniform, while the stream is gradually deflected without encountering any obstruction. Coils of wire, either covered with any suitable flexible material or not, may be used in place of overlapping leaves.

In order to balance the nozzle I mount a shaft, $q$, across the upper ends of the standards C C, above the joint, so that it will turn freely in the standards, and on this shaft I secure a drum, R. A chain or rope, S, has one end secured to the nozzle at some suitable point between the joint and its extreme end. This chain or rope extends back and passes once or more times around the drum R, and then has its opposite end fastened to the drum. A lever, T, which extends backward to the desired length, has its forward end fixed to the end of the shaft $q$, and a counter-weight, U, is arranged to be suspended from the lever. This weight can be adjusted to any desired point along the lever, in order to properly balance the weight of the pipe. Instead of a lever, I can use another drum, around which a chain or rope is wound in an opposite direction to that on the drum R, and to which I attach the balance-weight. This arrangement will preserve a uniform balance, no difference what position the nozzle may be moved to, and is, therefore, a great improvement upon the old lever-and-weight balance, whose leverage varied by its being drawn across its fulcrum according to the elevation of the pipe.

When this balancing attachment is not used I can do away with the upright standards C C and support the ring F in the outer extremities of two adjustable arms, which extend forward from opposite sides of the pipe I, and causing the ring F to revolve around a vertical or horizontal axis, as may be desired, thus virtually uniting the pipe I and nozzle by a strong and firm connection, which serves to preserve the relative positions with each other.

By this construction and application of the ball-and-socket joint I avoid much of the trouble heretofore encountered, and, besides, I do not impair the force and quality of the stream by a tortuous course or internal obstructions.

It will be noticed that I provide a gradually-decreasing area of the water-passage from the inlet of the pipe I to the discharge end of the nozzle, thus preserving the full effect of the stream.

Having thus described my invention, what I claim, and desire to secure by Letters Patent, is—

1. A ball-and-socket joint for uniting nozzles to water-pipes, in which the socket E is mounted upon or forms part of the gimbals or universal joint, while the ball or globular head J is arranged to enter said socket and be fixed in position, substantially as above described.

2. The nozzle D, with its socket E, mounted between standards C C inside of the journaled ring F, in combination with the pipe I, with its globular head J mounted upon the ledge $h$ and adjustable casting K, substantially as and for the purpose described.

3. In combination with the pipe I and nozzle D, united by a ball-and-socket joint, the diaphragm or articulating pipe, composed of the overlapping circular leaves or coils $b\ b$, substantially as and for the purpose described.

4. The drum R, fixed to the shaft $q$ and connected with the nozzle D by means of the chain or rope S, in combination with the lever or outside drum T and adjustable weight U, substantially as and for the purpose described.

J. J. CRAWFORD.

Witnesses:
GEO. H. STRONG,
JNO. L. BOONE.